United States Patent
Sugano et al.

(10) Patent No.: US 8,078,382 B2
(45) Date of Patent: Dec. 13, 2011

(54) CRUISE AND VEHICLE-FOLLOWING CONTROL SYSTEM INCLUDING DOUBLE BRAKES

(75) Inventors: Takashi Sugano, Brussels (BE); Nariaki Etori, Atsugi (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 43 days.

(21) Appl. No.: 11/376,255

(22) Filed: Mar. 15, 2006

(65) Prior Publication Data
US 2006/0212207 A1    Sep. 21, 2006

(30) Foreign Application Priority Data

Mar. 16, 2005  (JP) ................................ 2005-074586
Jan. 20, 2006  (JP) ................................ 2006-012208

(51) Int. Cl.
*B60T 7/12* (2006.01)
(52) U.S. Cl. ............................ 701/96; 701/93; 180/170
(58) Field of Classification Search .................... 701/83, 701/93, 96; 180/169, 170
See application file for complete search history.

(56) References Cited

U.S. PATENT DOCUMENTS

| | | | | |
|---|---|---|---|---|
| 4,969,103 A | * | 11/1990 | Maekawa | 701/96 |
| 6,128,559 A | * | 10/2000 | Saitou et al. | 701/23 |
| 6,279,937 B1 | * | 8/2001 | Hunt | 180/336 |
| 6,285,944 B1 | * | 9/2001 | Tange et al. | 701/96 |
| 6,360,158 B1 | * | 3/2002 | Hanawa et al. | 701/93 |
| 6,820,709 B1 | * | 11/2004 | Zimmermann et al. | |
| 2003/0033073 A1 | * | 2/2003 | Kichima et al. | 701/96 |
| 2005/0010352 A1 | * | 1/2005 | Michi et al. | 701/96 |

FOREIGN PATENT DOCUMENTS

| | | | |
|---|---|---|---|
| DE | 101 55 096 A1 | * | 5/2003 |
| DE | 103 20 722 A1 | * | 11/2004 |
| EP | 0 992 387 A2 | * | 4/2000 |
| EP | 1 304 251 A1 | * | 4/2003 |
| EP | 1 437 254 A1 | * | 7/2004 |
| JP | 10-338054 | | 12/1998 |
| JP | 2001-10371 | | 1/2001 |
| JP | 2001-010371 | | 1/2001 |
| JP | 2004-009914 A | | 1/2004 |
| JP | 2004-75055 | | 3/2004 |
| JP | 2004-106708 | | 4/2004 |
| JP | 2006-56398 | | 3/2006 |

OTHER PUBLICATIONS

Michi et al, Translation of DE 103 20 722, Motor vehicle speed regulator or ACC system with a stop and go capability is configured so that the vehicle can only be moved after automatic stopping if a driver issues a movement command and an activation signal exists.*

* cited by examiner

*Primary Examiner* — Khoi Tran
*Assistant Examiner* — Spencer Patton
(74) *Attorney, Agent, or Firm* — Young Basile (57) ABSTRACT

The vehicle is kept at a standstill even when an operation for ending adaptive cruise control is performed while the adaptive cruise control is on and the vehicle stop-maintenance control is on. When a vehicle comes to a stop while the adaptive cruise control is on, vehicle stop-maintenance control, preferably using electronic brake control, is carried out. When an operation for ending the adaptive cruise control is performed by the driver during this state, only the adaptive cruise control ends while the vehicle stop-maintenance control remains active.

10 Claims, 7 Drawing Sheets

CRUISE AND VEHICLE-FOLLOWING CONTROL SYSTEM INCLUDING DOUBLE BRAKES

TECHNICAL FIELD

The present invention pertains to an adaptive cruise control system for use when traveling in a vehicle.

BACKGROUND OF THE INVENTION

A conventional adaptive cruise control system for maintaining the headway distance between vehicles is known from Japanese Kokai Patent Application No. 2004-9914. The known device uses hydraulic brakes while the vehicle is traveling and switches to electric parking brakes as the vehicle comes to a stop so as to keep the vehicle stopped.

BRIEF SUMMARY OF THE INVENTION

A first aspect of the invention is an adaptive cruise control system for a vehicle comprising cruise control means for automatically following a preceding vehicle and stop-maintenance control means for causing the vehicle to remain at a halt when the preceding vehicle has halted while the cruise control means is on. The system also includes means for ending operation of the cruise control means. Control means keeps the stop-maintenance control means on when the stop-maintenance control means is on and the means for ending operation of the cruise control means is operated.

In another aspect of the invention, an adaptive cruise control system comprises an inter-vehicular distance sensor operable to detect a distance between the vehicle and a preceding vehicle, an actuation member operable to end cruise control of the vehicle and a halt retainer operable to maintain a stopped condition of the vehicle. A controller is operable to perform cruise control of the vehicle so as to travel automatically by following a preceding vehicle based on a signal from the inter-vehicular distance sensor. The controller is further operable to perform stop-maintenance control for remaining in the stopped condition when the vehicle comes to a halt while the cruise control is on by activating the halt retainer and is further operable to end the cruise control while the stop-maintenance control is kept on when actuation member is operated while the stop-maintenance control is on.

Another aspect of the invention is a method of operating an adaptive cruise control for a vehicle. The method comprises automatically following a preceding vehicle using cruise control, halting the vehicle when the preceding vehicle comes to a halt while the cruise control is on, switching to stop-maintenance control after halting the vehicle wherein the stop-maintenance control maintains a halted position of the vehicle and ending the cruise control while stop-maintenance control is on when an operation for ending the cruise control is performed.

Another method of operating an adaptive cruise control for a vehicle disclosed herein comprises following a preceding vehicle automatically, halting the vehicle once the vehicle has already stopped, ending the adaptive cruise control when an operation for ending the adaptive cruise control is performed by a driver, and keeping the vehicle stopped until a starting operation is performed by the driver even if the operation for ending the adaptive cruise control is performed.

Other inventive aspects of the apparatus and method are described in further detail hereinafter.

BRIEF DESCRIPTION OF THE DRAWINGS

The description herein makes reference to the accompanying drawings wherein like reference numerals refer to like parts throughout the several views, and wherein:

FIG. 4 is a flow chart showing the processing carried out by the adaptive cruise control system in the first embodiment while the adaptive cruise control is on;

FIG. 9 is an example display indicating that stop-maintenance control is off while adaptive cruise control is on;

FIG. 12 is another example display indicating that stop-maintenance control is on while adaptive cruise control is on.

DETAILED DESCRIPTION OF EMBODIMENTS OF THE INVENTION

In the conventional device described previously, the electric parking brakes are released when the driver has performed an operation to end the adaptive cruise control. Applicants have discovered that a stopped vehicle can begin to travel even when the driver has performed the operation to end the adaptive cruise control without being aware of it. The adaptive cruise control system in accordance with the present invention is characterized in that it performs automatic cruise control when traveling behind a vehicle and vehicle stop-maintenance control when the vehicle is at a stop. It ends the automatic cruise control while maintaining the vehicle stop-maintenance control when an operation for ending the adaptive cruise control is performed by the driver while the stop-maintenance control is on.

According to the present invention, because cruise control ends while the vehicle stop-maintenance control is still in action if the operation for ending the adaptive cruise control has been performed by the driver if it was on while the vehicle stop-maintenance control is on, the vehicle can be prevented from starting to travel even if the driver has performed the operation for ending the adaptive cruise control without being aware of it. Details of the invention are best described with reference to FIGS. 1-12.

Figure 1:
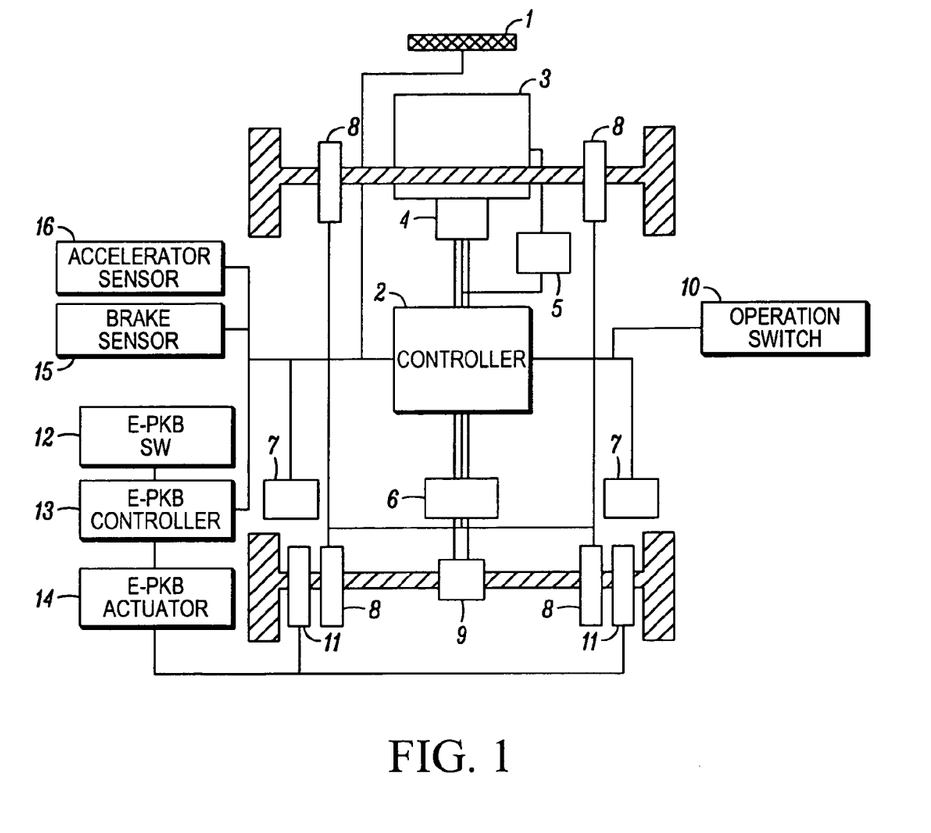
FIG. 1 is a diagram showing the main configuration of a vehicle equipped with an adaptive cruise control system in a first embodiment of the invention.

FIG. 1 is a diagram showing the main configuration of a vehicle equipped with an adaptive cruise control system in a first embodiment. The vehicle is equipped with an inter-vehicle distance sensor 1, a controller 2, an engine 3, an automatic transmission 4, a throttle actuator 5, a brake actuator 6, vehicle speed sensors 7, hydraulic brakes 8, a differential 9, an operation switch 10, electric parking brakes 11 (referred to herein as EPKB 11), an electric parking brake switch 12 (referred to herein as EPKB switch 12), an electric parking brake controller 13 (referred to herein as EPKB controller 13), an electric parking brake actuator 14 (referred to herein as EPKB actuator 14), a brake sensor 15 and an accelerator sensor 16.

Inter-vehicle distance sensor 1 is equipped with a radar device, whereby a laser beam is emitted from the front of the vehicle so as to detect a next-preceding vehicle and the distance to the detected next-preceding vehicle. Vehicle speed sensors 7 detect the speed of the vehicles. Controller 2 performs adaptive cruise control in order for the following vehicle to travel automatically behind the next-preceding vehicle based on the inter-vehicle distance detected by inter-vehicle distance sensor 1 and the speed of the following vehicle detected by vehicle speed sensors 7. That is, throttle actuator 5 and brake actuator 6 are controlled so as to keep a fixed inter-vehicle distance between the following vehicle and the next-preceding vehicle, provided that a preset vehicle speed is imposed as an upper limit.

Throttle actuator 5 controls the opening/closing of a throttle valve (not shown) according to an instruction from controller 2 in order to control the acceleration/deceleration of the vehicle. Brake actuator 6 controls the braking forces of hydraulic brakes 8 provided at the respective wheels according to a command from controller 2. Although hydraulic brakes 8 operate on the basis of a command from brake actuator 6, they may also be operated as the driver manipulates a brake pedal (not shown).

EPKB 11 are attached to the right and left rear wheels and lock the wheels by pressing abrasive materials (not shown) against the brake discs. EPKB switch 12 is a switch for applying/releasing EPKB 11. EPKB switch 12 is manipulated by the driver. EPKB actuator 14 activates/deactivates EPKB 11 based on the manipulation of EPKB switch 12 by the driver or an instruction from EPKB controller 13. EPKB actuator 14 is an electric motor, for example, and it activates EPKB 11, that is, presses the abrasive materials against the brake discs or winds up braking wires (not shown).

Brake sensor 15 detects the operation of the brake pedal by the driver. Accelerator sensor 16 detects the operation of an accelerator pedal (not shown) by the driver.

Figure 2:
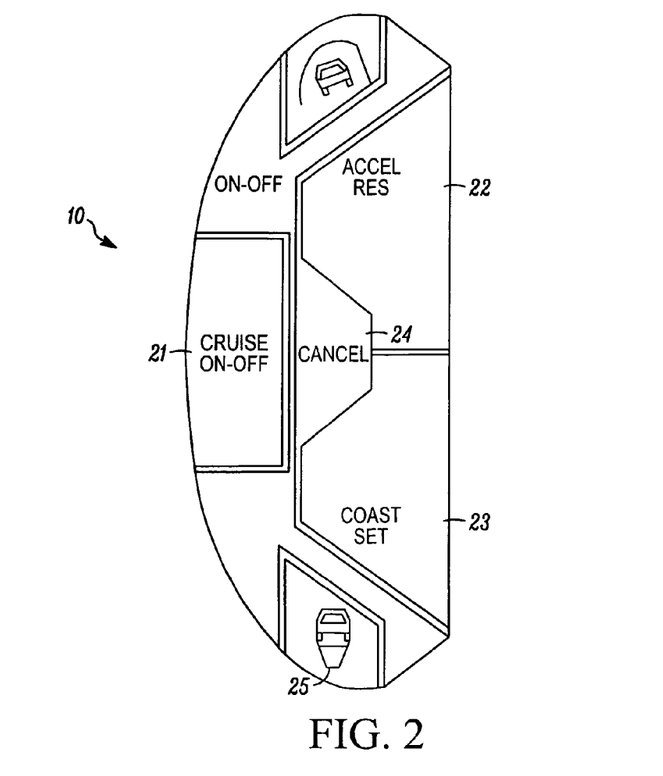
FIG. 2 is a plan diagram showing the detailed configuration of an operation switch.

FIG. 2 is a diagram showing a detailed configuration of an operation switch 10 that can be used to perform various types of operations for the adaptive cruise control. The operation switch 10 is provided on the steering wheel at a position where the driver can operate it easily. A main switch 21 is a switch for turning the adaptive cruise control system on and off. A resume/accelerate switch 22 is a switch for increasing the speed while the adaptive cruise control is on, and a set/coast switch 23 is a switch for reducing the speed while the adaptive cruise control is on. Set/coast switch 23 is also a switch for starting the adaptive cruise control when the adaptive cruise control system is on.

A cancel switch 24 is a switch for canceling the adaptive cruise control while the adaptive cruise control is on. An inter-vehicle distance setting switch 25 is a switch for changing the distance to the next-preceding vehicle. This distance is also called the inter-vehicle target distance.

Figure 3:
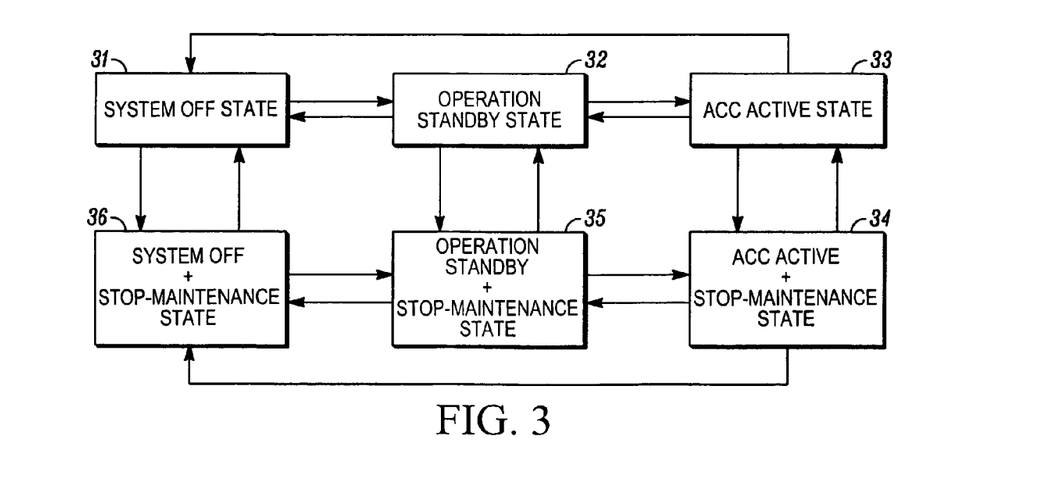
FIG. 3 is a diagram showing respective transition control states pertaining to adaptive cruise control.

FIG. 3 is a diagram showing respective transitional control conditions pertaining to the adaptive cruise control. State 31 is the state in which main switch 21 of operation switch 10 is off. That is, State 31 is the state in which the adaptive cruise control system is off. When main switch 21 is pressed while in State 31, a transition is made to State 32. State 32 is the state in which the adaptive cruise control system is on, but it is also an operation standby state in which the adaptive cruise control (ACC) is not yet initiated. When main switch 21 is pressed while in State 32, the adaptive cruise control is turned off, and a transition is made back to State 31. In addition, a transition is made from State 32 to State 31 when an abnormality in the adaptive cruise control system is detected.

State 33 is the state in which the adaptive cruise control is on. To make a transition from State 32 to State 33 three conditions must be met. Namely, the vehicle speed is 10-100 km/h, the brake pedal is not operated by the driver, and set/coast switch 23 is actuated. On the other hand, to make a transition from State 33, in which the adaptive cruise control is on, to State 32, one of the following four conditions (a) through (d) must be met.

(a) Driver operates the brake pedal;
(b) Cancel switch 24 is actuated;
(c) Automatic transmission 4 is shifted to a gear other than drive (D); or
(d) The wipers are operated continuously for at least a prescribed number of times.

That is, the conditions (a) through (d) are operations that will end (or cancel) the adaptive cruise control, so that when the driver performs one of (a) through (d), a transition is made to State 32, which is the adaptive cruise control standby state. The presence/absence of the operation of the brake pedal by the driver is detected by brake sensor 15 and input to controller 2.

State 34 is the state in which the adaptive cruise control is on and the stop-maintenance control for keeping the vehicle stopped is on. When the vehicle is decelerated to a standstill by following the next-preceding vehicle while in State 33, in which the adaptive cruise control is on, a transition is made to State 34. In State 33, in which the adaptive cruise control is on, controller 2 activates hydraulic brakes 8 using brake actuator 6 when it is determined that the vehicle must be decelerated. When the vehicle has come to a standstill when the next-preceding vehicle stops, controller 2 switches the brakes used to keep the vehicle stopped from hydraulic brakes 8 to EPKB 11. That is, once the vehicle comes to a stop controller 2 cancels the operation of the hydraulic brakes by brake actuator 6 and sends an instruction to activate EPKB 11 to EPKB controller 13. Upon receiving this instruction, EPKB controller 13 actuates EPKB actuator 14 in order to activate EPKB 11. Here, stop-maintenance control refers to the maintenance of the stopping of the vehicle by EPKB 11 or otherwise as described herein.

While in State 34, in which EPKB 11 are activated, when the accelerator pedal is manipulated, the vehicle begins to travel. A transition is made to State 33, in which the adaptive cruise control is on. Although it can be applied to allow the vehicle to begin to travel when the next-preceding vehicle has started, the adaptive cruise control in this embodiment does not allow the vehicle to start soon. That is, the adaptive cruise control does not allow the vehicle to begin to travel even if the next-preceding vehicle has started traveling; the vehicle is only allowed to begin to travel if a prescribed starting operation is performed by the driver, such as when operation of the accelerator pedal is detected by accelerator sensor 16. The prescribed starting operation may alternatively be manipulation of set/coast switch 23 in FIG. 2, for example, instead of the operation of the accelerator pedal. Any other arbitrary switch may also be utilized as long as the intention of the driver to initiate vehicle travel is clear.

While in State 34, in which the adaptive cruise control is on and the vehicle stop-maintenance control is on, when one of the aforementioned four conditions (a)-(d) is met, a transition is made to State 35. Although State 35 is also an operation standby state in which the adaptive cruise control is not yet initiated, the stop-maintenance control using EPKB 11 remains on.

In other words, in the case of the adaptive cruise control system of the first embodiment, when the driver performs the operation for ending (or canceling) the adaptive cruise control while the adaptive cruise control is on and the stop-maintenance control using EPKB 11 is on, the adaptive cruise control ends while the stop-maintenance control remains on. As a result, because EPKB 11 remain activated even if the driver has stepped down on the accelerator pedal or has pressed cancel switch 24 without being aware of it, the vehicle can be prevented from starting to travel unexpectedly.

To make a transition from State 35 to State 34, one the following four conditions (e) through (h) must be met.

(e) The vehicle is at a standstill (i.e., vehicle speed is 0);
(f) EPKB 11 remains activated;
(g) The driver performs the braking operation; or
(h) Set/coast switch 23 is actuated.

That is, while in State 35, in which the adaptive cruise control is off and the stop-maintenance control using EPKB 11 is on, when the driver actuates set/coast switch 23, a transition is made to State 34. This operation is the same as the operation for making a transition from State 32, in which the adaptive cruise control is off, to State 33, in which the adaptive cruise control is initiated based upon an initiating operation.

While in State 35, in which the adaptive cruise control is in the standby state and the stop-maintenance control using EPKB 11 is on, when the driver operates the accelerator pedal or EPKB switch 12, EPKB 11 are released. A transition is made to State 32. In addition, while in State 32, when the vehicle comes to a stop (i.e., vehicle speed is 0) and the driver manipulates EPKB switch 12, EPKB 11 are activated so as to transition to State 35, in which the vehicle stop-maintenance control is initiated.

While in State 35, in which the adaptive cruise control is in the standby state and the stop-maintenance control using EPKB 11 is on, when the adaptive cruise control system is shut off as main switch 21 is pressed, a transition is made to State 36. In addition, in the event of an abnormality in the adaptive cruise control system while in State 35, or when an operation for stopping engine 3 is performed, a transition is also made to State 36. Although the adaptive cruise control system is off while in State 36, EPKB 11 are enabled, that is, the vehicle stop-maintenance control is on. In other words, while in State 35, in which the adaptive cruise control system is on and the adaptive cruise control is in standby and the stop-maintenance control using EPKB 11 is on, when the operation for ending the adaptive cruise control system (turning main switch 21 off or stopping engine 3) is performed by the driver, the adaptive cruise control system is turned off while the stop-maintenance control using EPKB 11 remains on.

When the adaptive cruise control system is turned on as main switch 21 is pressed while in State 36, a transition is made to State 35. In addition, when the driver operates the accelerator pedal or operates EPKB switch 12 while in State 36, EPKB 11 are released, and a transition is made to State 31. While in State 31, when the vehicle comes to a stop (i.e., vehicle speed is 0), and the driver actuates EPKB switch 12, EPKB 11 are activated. A transition is made to State 36, in which the vehicle stop-maintenance control is initiated.

When the driver turns off main switch 21 or stops engine 3 while it is in State 33, in which the adaptive cruise control is active, the adaptive cruise control system ends, and a transition is made to State 31. In addition, in the event of an abnormality in the adaptive cruise control system, a transition is also made from State 33 to State 31.

While in State 34, in which the adaptive cruise control is active and the stop-maintenance control using EPKB 11 is on, when the driver turns off main switch 21 or stops engine 3, the adaptive cruise control system ends. A transition is made to State 36. That is, while in State 34, when the driver performs the operation for ending the adaptive cruise control system (turning off main switch 21 or stopping engine 3), only the adaptive cruise control system turns off, while the stop-maintenance control using EPKB 11 remains on. In addition, in the event of an abnormality in the adaptive cruise control system, a transition is also made from State 34 to State 36.

Figure 4:
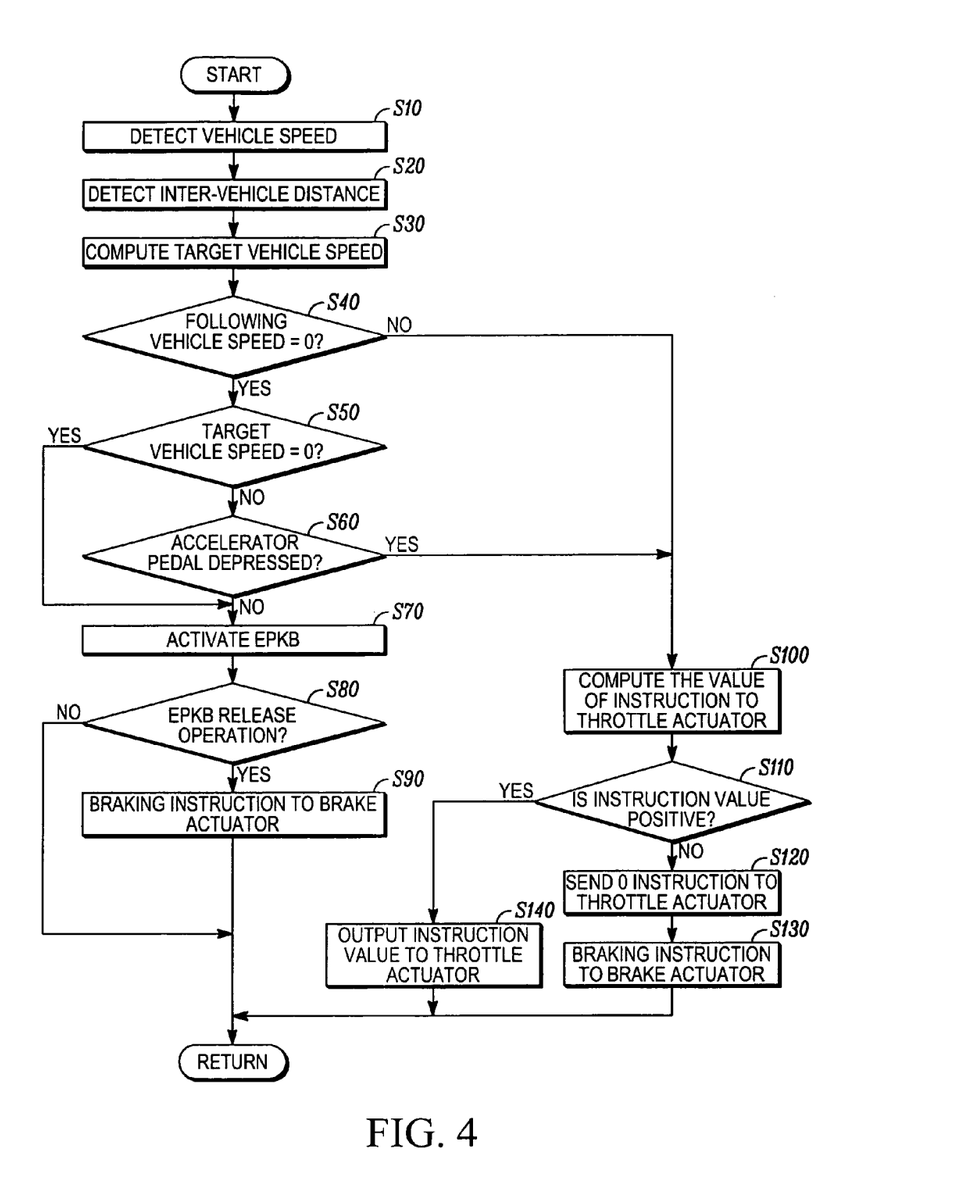

FIG. 4 is a flow chart showing the contents of processing carried out by the adaptive cruise control system of the first embodiment while in State 33, in which the adaptive cruise control is on and active. When the adaptive cruise control is initiated, controller 2 starts the process in step S10. In step S10, the speed of the following vehicle is detected by vehicle speed sensor 7, and processing advances to step S20.

In step S20, the inter-vehicle distance from the next-preceding vehicle to the following vehicle is detected by inter-vehicle distance sensor 1, and processing advances to step S30. In step S30, a target vehicle speed at which the following vehicle travels behind the next-preceding vehicle is computed based on the vehicle speed obtained in step S10 and the inter-vehicle distance obtained in step S20. The target vehicle speed can be computed using a known method. Once the target vehicle speed is computed, processing advances to step S40.

In step S40, whether the speed of the following vehicle has become 0, that is, whether the following vehicle has come to a standstill, is determined on the basis of the vehicle speed detected by vehicle speed sensor 7. When the speed of the following vehicle is judged to be 0, advancement is made to step S50. In step S50, whether the target vehicle speed computed in step S30 is 0 is determined. Processing advances to step S70 if the target vehicle speed is judged to be 0, and processing advances to step S60 if the target vehicle speed is other than 0.

In step S60, whether the accelerator pedal of the following vehicle has been pressed is checked. When the vehicle comes to a stop while the adaptive cruise control is on, and the inter-vehicle distance is increased as the next-preceding vehicle begins to travel, the target vehicle speed is no longer 0. Since the intention of the driver to initiate vehicle travel becomes clear as the driver steps on the accelerator pedal in this situation, processing advances to step S100. On the other hand, if a judgment is made that the accelerator pedal has not been pressed down, processing advances to step S70.

In step S70, a command to activate EPKB 11 is sent to EPKB controller 13 in order to initiate the adaptive cruise control, and an instruction to release hydraulic brakes 8 is sent to brake actuator 6. Upon receiving the command, EPKB controller 13 controls EPKB actuator 14 in order to activate EPKB 11. That is, the adaptive cruise control switches the brakes to keep the vehicle stopped from hydraulic brakes 8 to EPKB 11. As described above, the adaptive cruise control is not canceled and is left on. As a result, a transition is made from State 33 to State 34 in FIG. 3.

In step S80, which follows step S70, whether the operation for releasing EPKB 11 has been performed is checked. Even if the stop-maintenance control is on, when the driver presses EPKB switch 12, EPKB 11 are released. Processing advances to step S90 if the release of EPKB 11 is detected, or the vehicle stop-maintenance control remains on if the release operation is found to have not been performed.

In step S90, a command to release EPKB 11 is sent to EPKB controller 13, and a command to activate hydraulic brakes 8 is sent to brake actuator 6. A value sufficient for stopping the vehicle is used as the value of the braking output to brake actuator 6. Although EPKB controller 13 sends a command to release EPKB 11 to EPKB actuator 14, the time used to reduce the braking force when releasing EPKB 11 is longer than the normal release time. Normal release refers to the release of EPKB by means other than the releasing of EPKB 11 by the driver's pressing of EPKB switch 12 in State 34; for example, when the driver has operated the accelerator pedal or EPKB switch 12 while the adaptive cruise control is off and EPKB 11 is activated (State 35 or 36), or when the driver has actuated the accelerator pedal or set/coast switch 23 in State 34.

Figure 5:
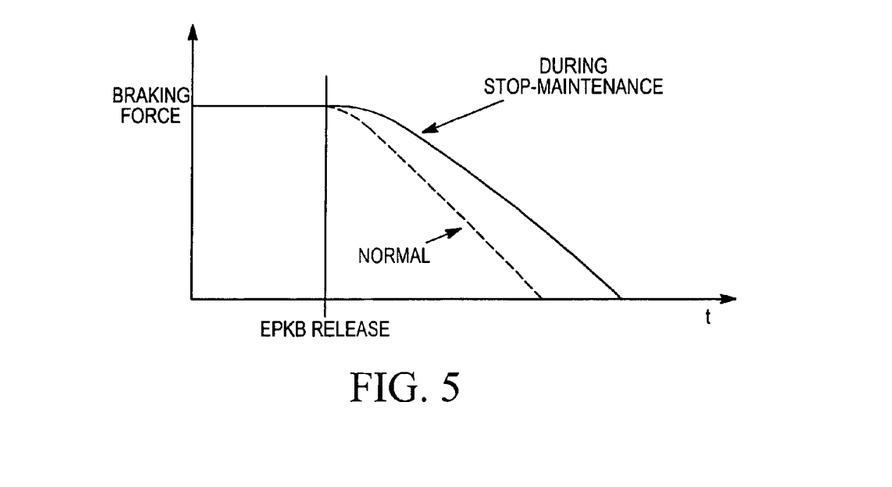
FIG. 5 is a graph showing changes in the braking force when the electronic parking brakes (EPKB) are released and changes in the braking force during the normal release of EPKB.

FIG. 5 is a diagram showing changes in the braking force of EPKB 11 when EPKB 11 are released in step S90, and changes in the braking force applied to EPKB 11 during a normal release of EPKB 11. The solid line in FIG. 5 indicates changes during the control performed in step S90, and the dotted line indicates changes during the normal release. Although the vehicle stop-maintenance control using EPKB 11 is switched to the vehicle maintenance control using hydraulic brakes 8 in step S90, as shown in FIG. 5, the vehicle can be kept at a standstill reliably even during the switching from EPKB 11 to hydraulic brakes 8 by delaying reduction of the braking force more than during the normal release of EPKB 11. Once the processing in step S90 is finished, process control returns to step S10.

Furthermore, the vehicle stop-maintenance control using hydraulic brakes 8 should be carried out only for a prescribed amount of time in order to prevent the continuous application of current to brake actuator 6 for a long period of time. That is, the vehicle stop-maintenance control using hydraulic brakes 8 should be switched to the vehicle stop-maintenance control using EPKB 11 when a prescribed amount of time has passed. Furthermore, while the stop-maintenance control using EPKB 11 is on, it is preferable to notify the driver of the ongoing stop-maintenance control by means of a display.

Returning now to FIG. 4, when the vehicle speed is judged to be other than 0 in step S40, processing advances to step S100. In step S100, a throttle actuator instruction value for accelerating/decelerating the vehicle speed is computed on the basis of the target vehicle speed computed in step S30 and the current vehicle speed of the following vehicle. Here, the instruction value for accelerating the vehicle is computed as a positive value if the vehicle speed is lower than the target vehicle speed, and the instruction value for decelerating the vehicle is computed as a negative value if the vehicle speed is higher than the target vehicle speed. Once the value of the instruction to throttle actuator 5 is computed, processing advances to step S110.

In step S110, it is determined whether the throttle actuator instruction value computed in step S100 is positive or negative. If the instruction value is found to be a positive value, processing advances to step S140. In step S140, the instruction value computed in step S100 is output to throttle actuator 5. The vehicle speed is increased so as bring the vehicle speed to the target vehicle speed as throttle actuator 5 controls the opening of a throttle valve (not shown) on the basis of the instruction value.

On the other hand, if the instruction value is found to be a negative value in step S10, processing advances to step S120. In step S120, an instruction with the value of 0 is output to throttle actuator 5. Processing then advances to step S130, where a target brake fluid pressure for activating hydraulic brakes 8 is computed, and an instruction value based on the target brake fluid pressure computed is output to brake actuator 6. The vehicle speed can be attenuated to match the target vehicle speed as brake actuator 6 activates hydraulic brakes 8 based on this instruction value. Once the process in step S130 or S140 is completed, process control returns to step S10.

According to the adaptive cruise control system of the first embodiment, when the following vehicle comes to a stop as the next-preceding vehicle stops while the adaptive cruise control is on, hydraulic brakes 8, which are used to attenuate the vehicle speed, are switched to EPKB 11, which are used to keep the vehicle stopped, i.e., to keep the vehicle at a standstill. When the operation for ending the adaptive cruise control is performed by the driver while the vehicle is at a standstill, the adaptive cruise control ends while the vehicle stop-maintenance control using EPKB 11 remains on. As a result, even when the driver inadvertently performs the operation for ending the adaptive cruise control while the vehicle is at a standstill, the stoppage of the vehicle can be maintained automatically via the adaptive cruise control. In this manner, the vehicle can be prevented from starting to travel unexpectedly. For example, even when the driver has pressed cancel switch 24 or stepped down on the brake pedal unintentionally, only the adaptive cruise control can be canceled while the vehicle stop-maintenance control using EPKB 11 remains on. In addition, because only the adaptive cruise control can be ended while leaving the vehicle stop-maintenance control using EPKB 11 on, even when main switch 21 is turned on or when engine 3 is stopped, the vehicle can be prevented from starting to travel unexpectedly. This is so even when the vehicle is stopped on a slope, for example.

In addition, the adaptive cruise control system of the first embodiment is configured in such a manner that if a prescribed operation is performed while the adaptive cruise control is off and the stop-maintenance control using EPKB 11 is on, then the adaptive cruise control or the operation standby state is initiated while the stop-maintenance control using EPKB 11 remains on. As a result, the adaptive cruise control or the operation standby state can be initiated even when the vehicle stop-maintenance control is on. In addition, because the prescribed operation is the same operation as that for initiating the adaptive cruise control or the operation standby state while the stop-maintenance control is off, the adaptive cruise control can be initiated easily even when the stop-maintenance control is on, which is a great convenience for the driver.

According to the adaptive cruise control system of the first embodiment, when the operation for releasing EPKB 11 is performed by the driver while the adaptive cruise control is on and the stop-maintenance control using EPKB 11 is on, EPKB 11 are released and hydraulic brakes 8 are activated. As a result, the vehicle can be kept at a standstill even when the driver has pressed EPKB switch 12 inadvertently. In addition, because the rate of reduction of the braking force of EPKB 11 is lower than the rate of reduction during the release of EPKB 11, the vehicle can reliably be maintained at a standstill.

According to the adaptive cruise control system of the first embodiment, EPKB 11 are released when the driver operates the accelerator pedal or set/coast switch 23 while the adaptive cruise control is on and the stop-maintenance control using EPKB 11 is on. That is, the stop-maintenance control has priority over the adaptive cruise control in order to keep the stop-maintenance control on even when the next-preceding vehicle has started to travel unless the intention of the driver to start travel becomes clear. Thus, control in accordance with the intention of the driver can be realized.

Figure 6:
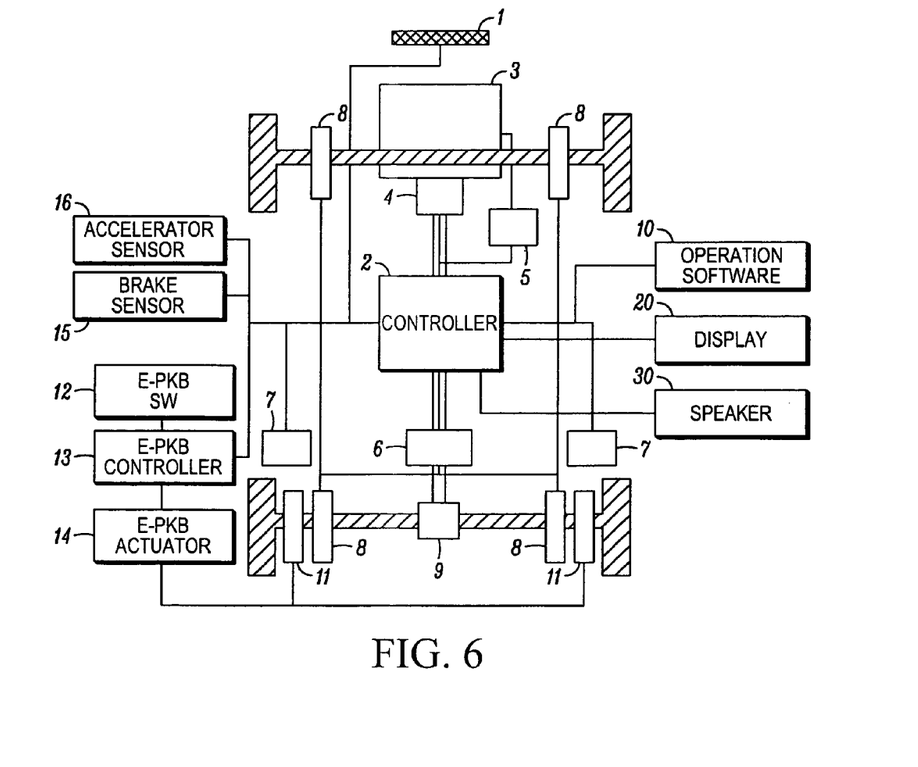
FIG. 6 is a diagram showing the main configuration of a vehicle equipped with an adaptive cruise control system in a second embodiment of the invention.

FIG. 6 is a diagram showing the main configuration of a vehicle equipped with an adaptive cruise control system in a second embodiment, wherein display 20 and speaker 30 are added to the configuration of the adaptive cruise control system in the first embodiment shown in FIG. 1. Display 20 is installed inside the car to present a display based on an instruction from controller 2. Speaker 30 is also installed inside the car to output a sound based on an instruction from controller 2.

The adaptive cruise control system in the second embodiment presents a display in such a manner that the driver can recognize which state the vehicle currently is in out of the various control states shown in FIG. 3 pertaining to adaptive cruise control. More specifically, the display is presented such that State 33, in which the adaptive cruise control is on, State 34, in which the adaptive cruise control is on and the vehicle stop-maintenance control is on, State 32, in which the adaptive cruise control is in the operation standby state, and State 35, in which the adaptive cruise control is in the operation standby state and the vehicle stop-maintenance control is on, can be identified among the various control states pertaining to adaptive cruise control.

Figure 7:
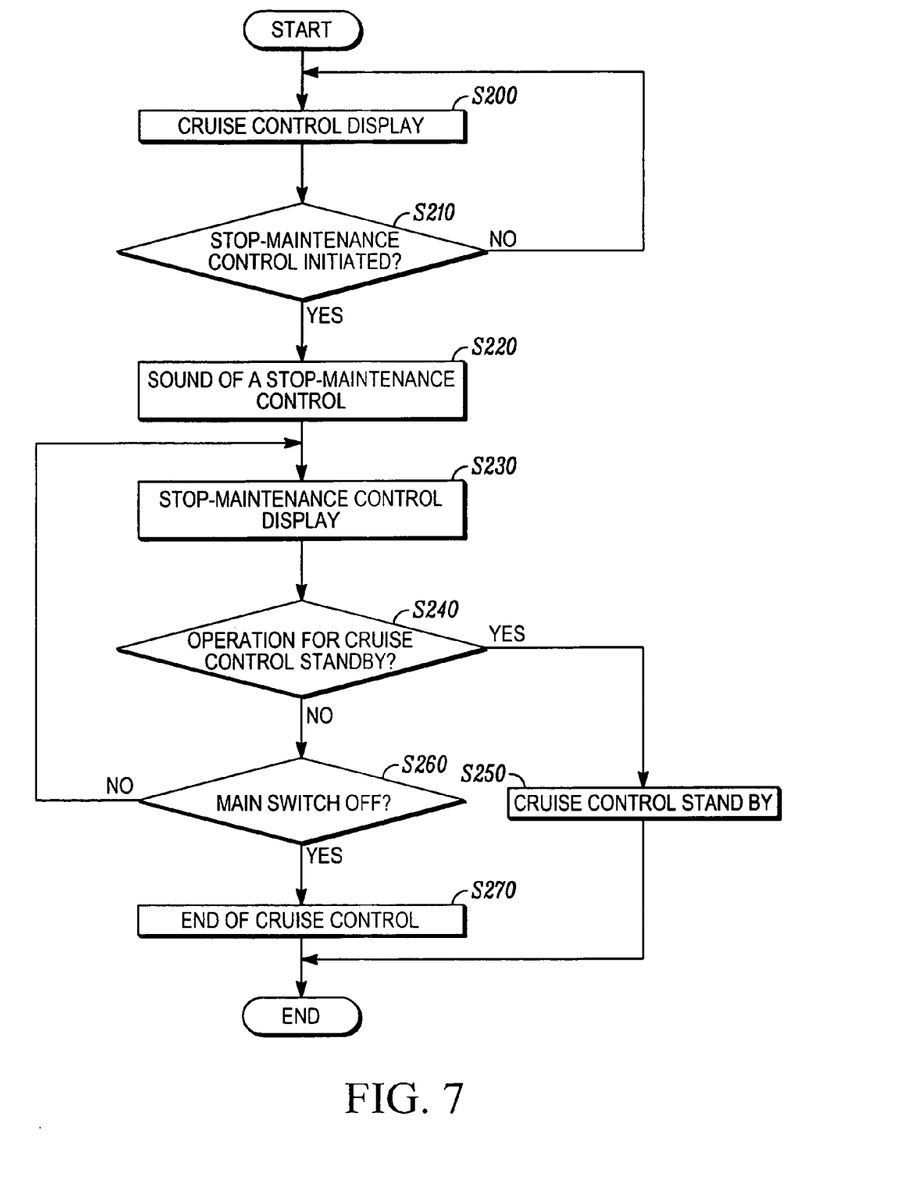
FIG. 7 is a flow chart showing the processing carried out by the adaptive cruise control system of the second embodiment.
Figure 8:
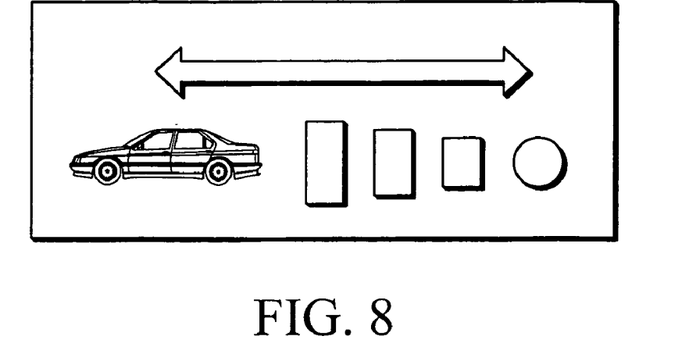
FIG. 8 is an example display indicating that adaptive cruise control is on while stop-maintenance control is off.

FIG. 7 is a flow chart showing the processing carried out by the adaptive cruise control system of the second embodiment. When the adaptive cruise control is initiated, controller 2 starts the process in step S200. In step S200, display 20 shows that the adaptive cruise control is on (State 33). FIG. 8 is an example display indicating that the adaptive cruise control is on while the stop-maintenance control is off.

In step S210, which follows step S200, whether stop-maintenance control is initiated is determined. As described above, while the adaptive cruise control is on when the following vehicle comes to a stop as the next-preceding vehicle stops, EPKB 11 are activated in order to carry out stop-maintenance control. When a judgment is made that stop-maintenance control has not yet been initiated, process control enters the standby state in step S200, and the display indicating that the adaptive cruise control is on remains on as shown in FIG. 8. On the other hand, when a judgment is made in step S210 that stop-maintenance control has been initiated, processing advances to step S220.

Figure 9:
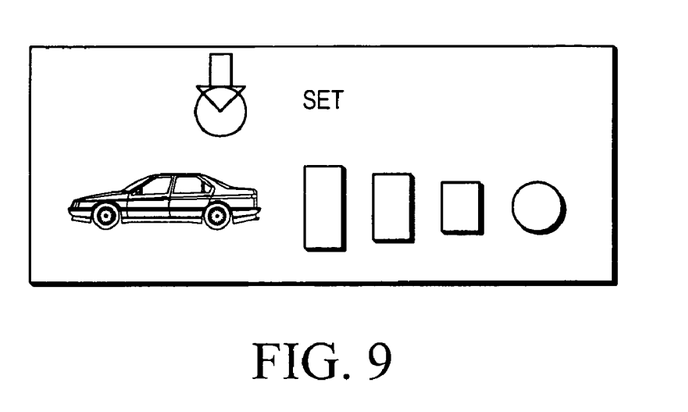

In step S220, a sound is output from speaker 30 in order to inform the driver of the transition from State 33 to State 34, that is, stop-maintenance control has been initiated while the adaptive cruise control is on. For example, a "blip" sound is output from speaker 30 to inform the driver that stop-maintenance control has been initiated. In step S230, which follows step S220, a display indicating that the stop-maintenance control is on while the adaptive cruise control is on is presented on display 20. This corresponds to State 34. FIG. 9 is an example display indicating that the stop-maintenance control is on while the adaptive cruise control is also on. The example display shown in FIG. 9, a picture illustrating depression of a button, is displayed along with the characters "SET." This example display shows visually that the adaptive cruise control can be used to accelerate (start) by pressing set/coast switch 23 to cancel the stop-maintenance control. That is, the driver detects that stop-maintenance control has been activated while the adaptive cruise control is on by confirming that the indication on display 20 has changed from the indication shown in FIG. 8 to the indication shown in FIG. 9 and confirms that the stop-maintenance control can be canceled by pressing set/coast switch 23 by looking at the indication shown in FIG. 9.

Figure 10:
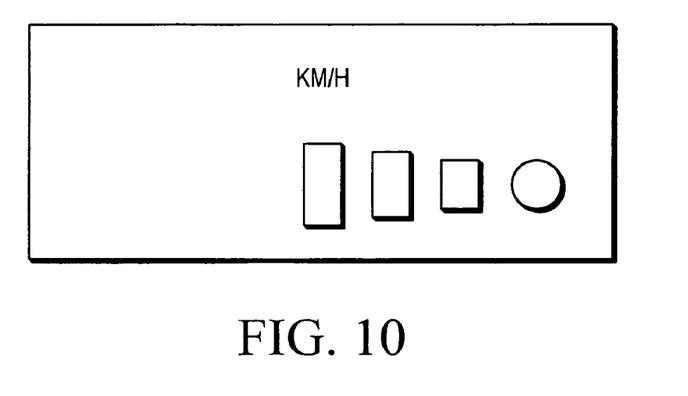
FIG. 10 is an example display indicating that the adaptive cruise control is in a standby state.

In step S240, which follows step S230, whether an operation has been performed to change the adaptive cruise control to the standby state, that is, whether at least one of aforementioned conditions (a)-(d) exists, is determined. When a judgment is made that at least one of aforementioned conditions (a)-(d) exists, processing advances to step S250. In step S250, the adaptive cruise control is changed to the standby state while the stop-maintenance control is kept on. As a result, a transition is made from State 34 to State 35 as shown in FIG. 3. At this time, the indication on display 20 is switched to a display indicating that the adaptive cruise control is in the standby state. FIG. 10 is an example display indicating that the adaptive cruise control is in the standby state. Here, the display indicating State 32 is identical to the display shown in FIG. 10.

On the other hand, if a judgment is made in step S240 that none of aforementioned conditions (a)-(d) exists, processing advances to step S260. In step S260, whether main switch 21 is turned off is determined. If a judgment is made that main switch 21 is turned off, processing advances to step S270. In step S270, the adaptive cruise control is ended while the stop-maintenance control is kept on. As a result, a transition is made from State 34 to State 36 as shown in FIG. 3. At this time, the indication on display 20 is switched to a display indicating that the adaptive cruise control has turned off.

On the other hand, if a judgment is made in step S260 that main switch 21 has not been turned off, process control returns to step S230.

According to the adaptive cruise control of the second embodiment, because the display indicating that the stop-maintenance control is on is presented when the stop-maintenance control is initiated while the adaptive cruise control is on, the driver can confirm visually that a transition has been made from the state in which the adaptive cruise control is used for automatic traveling to the vehicle stop-maintenance state. In contrast, a judgment can be made that the adaptive cruise control is kept on when the display indicating that the stop-maintenance control is on is absent.

When the adaptive cruise control is ended, the display indicating that the adaptive cruise control is off is presented, so the driver can confirm visually that the adaptive cruise control is off.

Furthermore, when the stop-maintenance control is initiated while the adaptive cruise control is on, the required method for starting the vehicle is displayed so the driver can recognize the required method for starting the vehicle easily. The driver can recognize the operation method quickly and easily, particularly when the required method for starting the vehicle is presented using at the display of least one of a character, a symbol and a picture.

The present invention is not restricted to the aforementioned embodiments. Although the vehicle is kept at a standstill by switching hydraulic brakes 8 to EPKB 11 when the vehicle comes to a stop while the adaptive cruise control is on in the aforementioned embodiment, the vehicle can be kept at a standstill with a different system. Although hydraulic brakes 8 are configured with a master cylinder (not shown), which compresses the brake fluid when the brake pedal is depressed and wheel cylinders (not shown), which apply braking force in response to the pressure applied by the master cylinder, an automatic stop-maintenance unit in which a solenoid may be installed between the master cylinder and the wheel cylinders may also be used, whereby the solenoid is closed so as to trap the brake fluid when the vehicle is to be stopped in order to keep the vehicle stopped.

Figure 11:
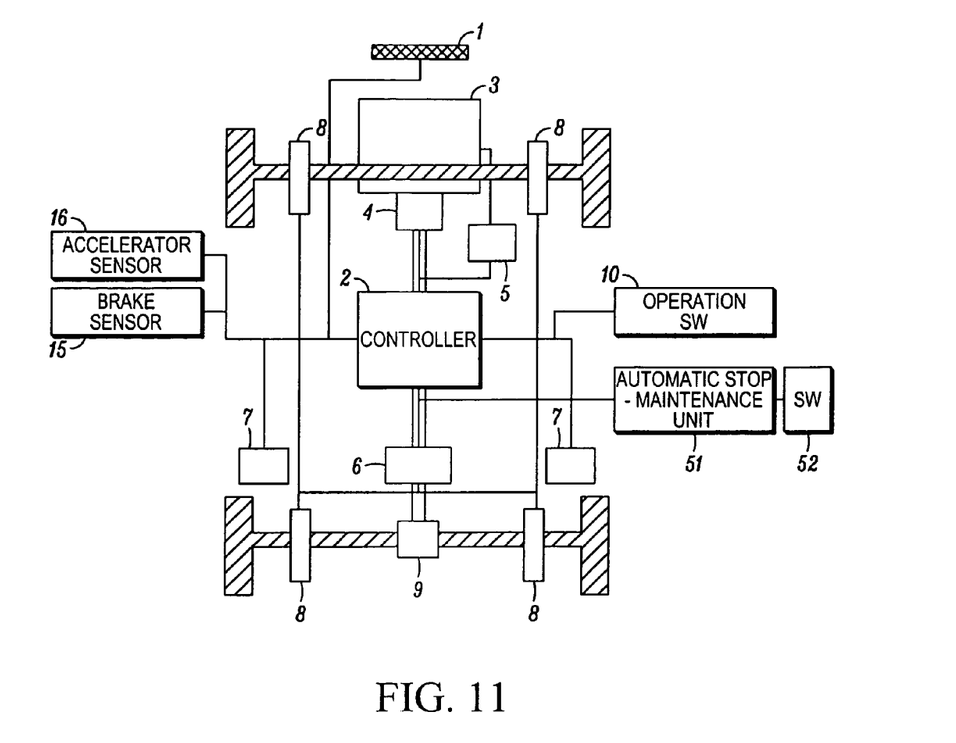
FIG. 11 is a diagram showing the main configuration of a vehicle equipped with an automatic stop-maintenance unit in place of the EPKB.

FIG. 11 is a diagram showing the configuration of a vehicle equipped with the automatic stop-maintenance unit. Unlike the configuration shown in FIG. 1, it is equipped with an automatic stop-maintenance unit 51 and an automatic stop-maintenance switch 52 in place of EPKB 11, EPKB switch 12, EPKB controller 13 and EPKB actuator 14. Automatic stop-maintenance unit 51 is a device for keeping the vehicle stopped with this configuration, and automatic stop-maintenance switch 52 is a switch used for switching to a state that allows automatic stop-maintenance unit 51 to function. Like the stop-maintenance control using EPKB 11, when the vehicle comes to a stop while automatic stop-maintenance unit 51 is enabled and the adaptive cruise control is on, automatic stop-maintenance unit 51 becomes activated in order to keep the vehicle stopped.

The same processes that were performed by the adaptive cruise control of the previous embodiments can also be performed by the configuration using automatic stop-maintenance unit 51 in that the vehicle stop-maintenance is effected by automatic stop-maintenance unit 51 instead of by EPKB 11. For example, when the operation for ending the adaptive cruise control is performed by the driver while the adaptive cruise control is on and the stop-maintenance control by automatic stop-maintenance unit 51 is on, the adaptive cruise control ends while the vehicle stop-maintenance control by automatic stop-maintenance unit 51 remains on. As a result, the vehicle can be kept at a standstill even when the driver has performed the operation for ending the adaptive cruise control inadvertently.

If the stop-maintenance control is canceled as the driver presses automatic stop-maintenance switch 52 while the adaptive cruise control is on and the vehicle stop-maintenance control by automatic stop-maintenance unit 51 is on, then the stop-maintenance control by automatic stop-maintenance unit 51 is canceled, and a command is sent to brake actuator 6 in order to activate hydraulic brakes 8. That is, the stop-maintenance control is canceled using the solenoid (not shown) for trapping the brake fluid, and hydraulic brakes 8 are activated using brake actuator 6.

A device different from EPKB 11 or automatic stop-maintenance unit 51 may be used for the vehicle stop-maintenance control. However, because current is continuously applied to brake actuator 6 for a long period of time if hydraulic brakes 8 are used for the vehicle stop-maintenance control while the automatic stop-maintenance control is on, a high current specification must be adopted for brake actuator 6. Therefore, it is preferable to use a system other than the brake actuator when implementing the stop-maintenance control. Furthermore, both EPKB 11 and automatic stop-maintenance unit 51 may be installed, and either EPKB 11 or automatic stop-maintenance unit 51 may be selected depending on the given situation.

Although one of the aforementioned conditions (a) through (d) is to be met in order to make a transition from State 34, in which the adaptive cruise control is on and the stop-maintenance control is on, to State 35, in which the stop-maintenance control is on and the adaptive cruise control is in standby state, conditions other than (a) through (d) may be added.

Although the example display indicating that the adaptive cruise control is on and the stop-maintenance control is off, the example display indicating that the stop-maintenance control is on while the adaptive cruise control is on, and the example display indicating that the adaptive cruise control is in the standby state are shown in FIG. 8, FIG. 9 and FIG. 10, respectively, the display methods are not restricted to those shown in the figures as long as they allow the current control state to be recognized.

Figure 12:
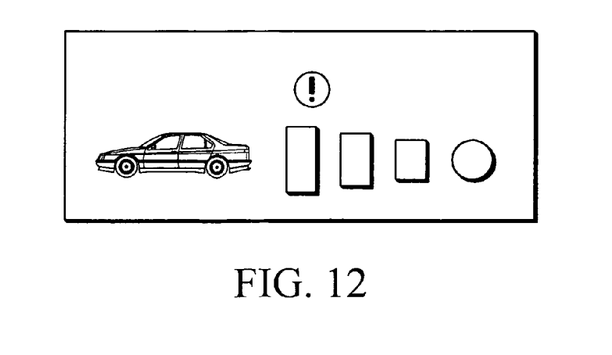

FIG. 12 is another example display indicating that the stop-maintenance control is on while the adaptive cruise control is on. In the example display shown in FIG. 12, an exclamation mark (!) is used to indicate that the stop-maintenance control is on. The driver knows that the exclamation mark is displayed on display 20 when EPKB 11 are activated during the normal driving operation, and the exclamation mark disappears when the accelerator pedal is stepped on to start moving the vehicle. That is, the exclamation mark is used to let the driver know indirectly that "the vehicle has started and the adaptive cruise control is initiated when the accelerator pedal is stepped on."

In the aforementioned first and the second embodiments, a transition is made to State 34 when the following vehicle slows down to a stop following the next-preceding vehicle while in State 33, in which the adaptive cruise control is on. However, stop-maintenance control may be initiated before the following vehicle comes to a full stop. For example, stop-maintenance control may be initiated based on a judgment that an operation for stopping will begin when the speed of the following vehicle reaches 5 km/h or less as the next-preceding vehicle slows down. In this case, the indication displayed on display 20 is switched from the indication shown in FIG. 8 to the indication shown in FIG. 9 when the speed of the following vehicle reaches 5 km/h or less, the stop-maintenance control is turned on and a switch is made to EPKB 11 without following the next-preceding vehicle even if that vehicle accelerates again.

This application is based on Japanese Patent Application Nos. 2005-074586, filed Mar. 16, 2005 and 2006-12208, filed Jan. 20, 2006 in the Japanese Patent Office, the entire contents of which are hereby incorporated by reference.

Also, the above-described embodiments have been described in order to allow easy understanding of the present invention, and do not limit the present invention. On the contrary, the invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An adaptive cruise control system for a vehicle, comprising:
    cruise control means for automatically following a preceding vehicle, the cruise control means including at least three states while the vehicle is on and the at least three states including a cruise control system off state, a cruise control system activated state wherein the cruise control means is on and initiated and a cruise control system stand-by state wherein the cruise control means is on and not initiated;
    first brakes configured to slow down the vehicle; and
    stop-maintenance control means having second brakes operated using a different method than the first brakes for causing the vehicle to remain at a halt, the stop-maintenance control means automatically initiating the second brakes when the preceding vehicle has halted while the cruise control means is in the cruise control system activated state;
    wherein the stop-maintenance control means is configured to keep the second brakes on once initiated even though the cruise control means transitions from the cruise control system activated state to the cruise control system stand-by state or the cruise control system off state in response to one of a plurality of first user-actuated vehicle conditions;
    wherein the stop-maintenance control means is configured to activate the second brakes by a second user-actuated vehicle condition when the cruise control means is in cruise control system off state and to deactivate the second brakes by one of a plurality of third user-actuated vehicle conditions when the cruise control means is in cruise control system off state;

wherein the stop-maintenance control means is configured to activate the second brakes by the second user-actuated vehicle condition when the cruise control means is in cruise control system stand-by state and to deactivate the second brakes by one of the plurality of third user-actuated vehicle conditions when the cruise control means is in cruise control system stand-by state; and wherein the stop-maintenance control means deactivates the second brakes in response to one of a plurality of fourth user-actuated vehicle conditions when the cruise control means is in the activated state and whether or not the preceding vehicle begins moving.

2. The adaptive cruise control system according to claim 1 wherein the plurality of first user-actuated vehicle conditions includes operating the first brakes, shifting a gear out of drive, maintaining activation of wipers for a period of time, and pressing a cruise control operation switch.

3. The adaptive cruise control system according to claim 1, further comprising:

a brake actuator to control the first brakes; and wherein the cruise control means is configured to transmit a command to the stop-maintenance control means to end stop-maintenance control using the second brakes and to transmit a command to the brake actuator to control the first brakes when the cruise control means transitions from one of the cruise control system off state, the cruise control system stand-by state or the cruise control means activated state with the second brakes activated to the one of the cruise control system off state, the cruise control system stand-by state or the cruise control means activated state with the second brakes deactivated.

4. The adaptive cruise control system according to claim 3, further comprising:

an electronic parking brake switch that selectively controls the stop-maintenance control means to activate and deactivate the second brakes responsive to manual manipulation of the electronic parking brake switch;

wherein the plurality of third user-actuated vehicle conditions and the plurality of fourth user-actuated vehicle conditions each include a condition where the electronic parking brake switch is manually manipulated; and wherein an attenuation rate of a braking force of the second brakes when the electronic parking brake switch is manually manipulated to deactivate the second brakes is lower than a normal attenuation rate of the braking force when the second brakes are deactivated responsive to another of the third user-actuated vehicle conditions or another of the fourth user-actuated vehicle conditions.

5. The adaptive cruise control system according to claim 1 wherein the first brakes are hydraulic brakes; and wherein the second brakes are electronic parking brakes operable to gain braking force by utilizing the torque of an electric motor.

6. The adaptive cruise control system according to claim 1 wherein the first brakes are hydraulic brakes; and wherein the second brakes are operable to maintain the halt of the vehicle through confinement of brake fluid of the hydraulic brakes.

7. The adaptive cruise control system according to claim 1, further comprising:

a display device connected to the cruise control means; and wherein the cruise control means is configured to display on the display device the state of the cruise control means, a status of the stop-maintenance control means and a necessary operation method for releasing the stop-maintenance control means.

8. The adaptive cruise control system according to claim 7 wherein the cruise control means is further configured to display the necessary operation method using at least one of a character, a symbol and a picture.

9. The adaptive cruise control system according to claim 1, further comprising:

an alarm connected to the cruise control means and configured to provide a sound indicating the stop-maintenance control means has been initiated while the adaptive cruise control is on.

10. The adaptive cruise control system according to claim 1 wherein the plurality of fourth user-actuated vehicle conditions includes pressing an accelerator pedal.

* * * * *